Patented Oct. 28, 1941

2,260,329

UNITED STATES PATENT OFFICE 2,260,329

COMPOSITION OF MATTER CONTAINING A FILM-FORMING DERIVATIVE OF CELLULOSE

William Henry Moss, London, England, assignor to Celanese Corporation of America, a corporation of Delaware No Drawing. Application September 30, 1937, Serial No. 166,607. In Great Britain October 12, 1936

4 Claims. (Cl. 106—176)

This invention relates to a new class of chemical compounds and to the use of compounds of this class as modifiers for incorporation in compositions of matter, especially those containing a cellulose ester or ether.

In the production of coating compositions, moulding powders, plastics and the like from cellulose esters and ethers, polymerised vinyl compounds and the like, it is frequently of advantage to incorporate in the composition a plasticiser and/or a resin in order to modify the properties of the product. Thus for example a plasticiser may be incorporated in a film to impart flexibility thereto, or a resin incorporated in a varnish to improve the varnish film. It is highly desirable that such modifiers should be of good compatibility with the cellulose ester or ether or other base material of the composition and should be fast to light.

The compounds of the invention are prepared by reacting aromatic sulphonamides with di- or poly-halogen-hydrins. It has been found that the compounds so obtained possess high compatibility with cellulose esters and ethers, polymerised vinyl compounds, for instance polymerised vinyl acetate, and the like, and excellent fastness to light. Such compounds are novel, and the invention includes the production of the compounds, the compounds so produced, and the application of the compounds in the plastics art. The products obtained by esterifying or etherifying these new compounds are also compatible with certain cellulose esters and ethers and the like and possess excellent fastness to light, and the invention also includes the production of these esterified or etherified products, the products themselves, and the application of the products in the plastics art.

The aromatic sulphonamide may contain a single ring as in benzene sulphonamide, or more than one ring, as for example in the naphthalene sulphonamides. The aromatic sulphonamide may be substituted in the aromatic nucleus, for example by alkyl groups, e. g. methyl or ethyl groups, acidylamino groups, hydroxy groups or halogen atoms or other atoms or groups, or unsubstituted. One of the hydrogen atoms of the amino group of the sulphonamide may be substituted, for instance by an alkyl or aralkyl group. Examples of suitable sulphonamides are the toluene and xylene sulphonamides, and the ortho- and para-toluene sulphonamides are especially suitable.

Any suitable di- or poly-halogen-hydrin may be employed, for instance symmetrical glycerol dichlorhydrin, asymmetrical glycerol dichlorhydrin, or a dichlor secondary butyl alcohol.

The compounds of the invention may be produced by condensing the sulphonamide and the halogen-hydrin in equal or unequal molecular proportions, for instance in the proportions of two molecules of the sulphonamide to one molecule of the halogen-hydrin, and may be cyclic compounds of the type

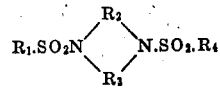

where $R_1$ and $R_4$ are aryl groups, and $R_2$ and $R_3$ are halogen-hydrin residues, or chain compounds of the type

where $R_1$, $R_4$ and $R_5$ are aryl groups, and $R_2$ and $R_3$ are halogen-hydrin residues. In general, the compounds of the first type, i. e. the cyclic compounds, are crystalline substances, and the compounds of the second type, i. e. the chain compounds, are resinous substances. The nature of the compound produced by condensing the sulphonamide and the halogen-hydrin depends upon the reaction conditions, and a mixture of crystalline and resinous products may be produced. In such a case the mixture produced may if desired be used as a modifier in the plastics art, or may be esterified or etherified to give another modifier, without separating the crystalline and resinous substances. Alternatively the substances may be separated, for instance by crystallising the crystalline substance from a solution of the mixed product, and used separately.

The condensation may suitably be effected in the presence of an alkaline substance, for instance by dissolving the sulphonamide in aqueous caustic soda or other alkali solution, and heating the solution with the halogen-hydrin.

The compounds produced from the sulphonamides and halogen-hydrins are in general of excellent compatibility with cellulose acetate. They may, however, be employed in conjunction with other derivatives of cellulose, e. g. cellulose nitrate, cellulose formate, cellulose propionate, cellulose butyrate or other cellulose ester, or methyl cellulose, ethyl cellulose, benzyl cellulose or other cellulose ether.

The compounds prepared from the aromatic sulphonamides and the halogen-hydrins may, as stated above, be esterified, for instance by treatment with an acid, acid anhydride or acid chloride. Suitable esterifying agents are acetic anhydride, phthalic anhydride, phenyl acetic acid and phenoxy acetic acid. The products obtained by esterifying with aromatic esterifying agents are in general resinous in character. Thus if the product obtained by condensing equimolecular proportions of toluene sulphonamide with symmetrical glycerol dichlorhydrin is esterified with phthalic anhydride a hard brittle yellow resin is produced, and resinous products are also obtained by esterifying with phenyl acetic acid or phenoxy acetic acid.

The compatibility of the esterified compounds with different base materials depends upon the extent of the esterification. Thus, in general, the fully esterified compounds are of excellent compatibility with nitro-cellulose and benzyl cellulose, but are only of limited compatibility with cellulose acetate, ethyl cellulose and polymerised vinyl acetate. The partially esterfied compounds are in general more compatible with these latter base materials than are the fully esterified compounds, and it would appear that the greater the degree of esterification the less compatible is the product with cellulose acetate, ethyl cellulose and polymerised vinyl acetate. Thus if the product obtained by condensing equimolecular proportions of toluene sulphonamide and symmetrical glycerol dichlorhydrin is esterified with the amount of phthalic anhydride theoretically required for complete esterification, the product is a hard brittle resin melting at 60° C. and only slightly compatible with cellulose acetate. If, however, the esterification is carried out with only 75% of the above amount of phthalic anhydride, the product is a hard brittle resin which melts at 80° C. and is compatible with cellulose acetate.

The compounds produced for aromatic sulphonamides and di- or poly-halogen-hydrins according to the invention may also be esterified to give other compounds of use in compositions containing cellulose derivatives and other base materials, as stated above. Suitable etherifying agents are methyl chloride and diethyl sulphate.

The compounds of the invention may be incorporated with cellulose esters, cellulose ethers and other base materials in any convenient manner. Thus for example the desired compound may be incorporated in a solution of a cellulose derivative in a volatile solvent and the solvent evaporated, if a solid product is required. The compound may be worked up mechanically with the cellulose derivative in conjunction with a small quantity of a volatile solvent for the compound and for the cellulose derivative. Again, the compound may be absorbed by a cellulose derivative directly from a solution or dispersion of the compound or by precipitation of the compound on to the finely divided cellulose derivative from a solution of the compound.

The compositions of matter produced by combining the compounds of the present invention with cellulose esters, cellulose ethers and other base materials may be in liquid or solid form and may be utilised for a large number of purposes. Solutions of cellulose esters or ethers containing the compounds of the invention in volatile solvents, such for example as acetone, with or without other substances, such for example as other plasticisers, medium or high boiling solvents, resins whether natural or synthetic, fire-retardants, effect materials and the like, may be employed as lacquers, varnishes, adhesives or other coating or impregnating compositions, e. g. for the protection of rubber and other insulation and for insulating purposes generally. Solutions containing cellulose esters or ethers and the compounds of the invention in volatile solvents may also be deposited on a smooth surface, such for example as the surface of a travelling band or the like and the volatile solvent evaporated or otherwise removed so as to form foils or films. Again, the solutions may be extruded into an evaporative atmosphere or into a precipitating bath and artificial filaments formed. Solutions containing cellulose esters or ethers and the compounds of the invention and also colouring materials may be employed as inks for printing plastic materials such as cellulose acetate film.

The compositions, for example in the form of moulding powders, may be moulded for example by pressure moulding processes or by injection moulding to form articles, or the compositions may be worked up into sheets suitable, for example, for use as the reinforcing material in splinterless glass, or into rods, tubes or blocks.

The compounds prepared by condensing aromatic sulphonamides with di- or poly-halogen-hydrins are of particular value for use in cellulose acetate coating compositions to be employed for coating cellulose derivative sheets, composed, for instance, of the material sold under the registered trade-mark "Celastoid." A surfacing lacquer for "Celastoid" containing cellulose acetate and one of the above compounds does not cause warping of the "Celastoid." The compounds are also of particular value for use in coating compositions for use, for instance, in coating surfaces of metal, bricks, cement or plaster. Thus the surface may be first coated with a composition containing cellulose acetate and a non-light fast resin giving good adhesion to the surface, and the coated surface provided with another coating of a composition containing cellulose acetate and one of the above compounds, whereupon a finish is obtained that does not tend to shrink and come away from the coated surface but is nevertheless substantially light fast. The esterified and etherified compounds may be similarly employed in conjunction with cellulose derivatives with which they are compatible.

The proportion of the compounds of the invention employed in compositions containing base materials and the compounds will depend upon the particular purpose of the compositions. The amount of modifier employed in producing cellulose acetate plastics may be from less than 25 to 50 or 100% of the weight of the cellulose acetate, or even more. For more flexible products more than 50% of modifier based on the weight of the cellulose acetate may be employed, whilst for very hard products less than 25%, e. g. 10%, of the modifier may be employed. For plasticising benzyl cellulose rather less modifier is necessary than for plasticising cellulose acetate for the same degree of flexibility to be obtained.

The invention is illustrated by the following examples:

*Example 1*

17 parts by weight of p-toluene sulphonamide are dissolved in 8 parts by weight of caustic soda and 40 parts by weight of water, and 13 parts by weight of symmetrical glycerol dichlorhydrin are added. The mixture is then heated under reflux for from one to two hours, whereupon a white oily product separates, which solidifies to an opaque resin on cooling.

On washing the product with hot water, fusing and then cooling, a pale yellow resin melting at about 105–110° C. is obtained.

A crystalline compound melting at about 204° C. may be separated from the pale yellow resin by dissolving it in twice its weight of acetone or alcohol, crystallising the solution, and recrystallising from an aqueous alcoholic solution the crystals separating.

Both the pale yellow resin and the crystalline compound are of excellent compatibility with cellulose acetate, nitrocellulose, benzyl cellulose, ethyl cellulose and polymerised vinyl acetate and are light fast.

*Example 2*

34 parts by weight of p-toluene sulphonamide are dissolved in 8 parts by weight of caustic soda and 40 parts by weight of water, and 13 parts by weight of symmetrical glycerol dichlorhydrin are added. The mixture is then heated under reflux for about three hours at 100° C., whereupon a product separates which on cooling forms a soft white resinous substance.

On washing this substance with hot water, fusing and then cooling, a resin melting at about 45–50° C. is obtained, which is of excellent compatibility with cellulose acetate and other base materials and is light fast. As in Example 1, a certain amount of a crystalline substance is formed simultaneously with the resinous substance.

*Example 3*

The resin melting at about 45–50° C. produced according to Example 2 is acetylated by heating it for two hours at 100° C. with an equal weight of 50% acetic anhydride. The reaction mixture is then poured into water, whereupon a precipitate is obtained which, on washing with hot water and fusing, yields a clear hard resin of melting point about 50° C.

The resin so obtained is compatible with cellulose acetate and other base materials and is light fast.

*Example 4*

A composition which may be employed as a lacquer or coating composition or for other purposes is as follows:

| | Parts by weight |
|---|---|
| Cellulose acetate | 10 |
| Resin produced in accordance with Example 1, 2 or 3 | 10 |
| Triacetin | 5 |
| Acetone or methyl ethyl ketone | 40 |
| Alcohol | 17 |
| Benzene | 25 |
| Diacetone alcohol | 19 |
| Pigment or dye | 5 to 20 |

*Example 5*

Another composition which may be employed as a lacquer or coating composition or for other purposes is as follows:

| | Parts by weight |
|---|---|
| Cellulose acetate | 5 |
| Resin produced in accordance with Example 1, 2 or 3 | 20 |
| Triacetin | 5 |
| Acetone or methyl ethyl ketone | 40 |
| Alcohol | 17 |
| Benzene | 25 |
| Diacetone alcohol | 19 |
| Pigment or dye | 5 to 20 |

*Example 6*

Another composition which may be employed as a lacquer or coating composition or for other purposes is as follows:

| | Parts by weight |
|---|---|
| Cellulose acetate | 20 |
| Resin produced in accordance with Example 1, 2 or 3 | 5 |
| Triacetin | 10 |
| Acetone or methyl ethyl ketone | 40 |
| Alcohol | 17 |
| Benzene | 25 |
| Diacetone alcohol | 19 |
| Pigment or dye | 5 to 20 |

*Example 7*

Another composition which may be employed as a lacquer or coating composition or for other purposes is as follows:

| | Parts by weight |
|---|---|
| Cellulose acetate | 20 |
| Resin produced in accordance with Example 1, 2 or 3 | 10 |
| Triacetin | 20 |
| Acetone or methyl ethyl ketone | 40 |
| Alcohol | 17 |
| Benzene | 25 |
| Diacetone alcohol | 19 |
| Pigment or dye | 5 to 20 |

The triacetin in the composition given in Examples 4 to 7 may be replaced by dimethyl phthalate, dibutyl tartrate, mono-methyl xylene sulphonamide, or other plasticisers, and the diacetone alcohol by ethyl lactate, cyclohexanone, ethylene glycol mono-methyl ether, dioxane or other solvents. The resin may if desired be used in admixture with other resins compatible with cellulose acetate.

The cellulose acetate in the compositions of Examples 4 to 7 may be replaced by nitrocellulose, benzyl cellulose, ethyl cellulose or polymerised vinyl acetate, providing that care is taken when using these base materials that the presence of incompatible substances is avoided.

While the invention has been described more particularly in connection with cellulose ester or ether compositions, the plasticisers and resins hereinbefore described may be employed in other types of plastic compositions, e. g. polymerised vinyl acetate or other polyvinyl or synthetic resin compositions, which may or may not contain a cellulose ester or ether.

Having described my invention, what I desire to secure by Letters Patent is:

1. A composition of matter containing a film-forming substance selected from the class of derivatives of cellulose consisting of organic acid esters of cellulose and cellulose ethers and a condensation product of an aliphatic halide containing at least two halogen atoms and at least one alcoholic group and a substance selected from the class consisting of toluene and xylene sulphonamides, said condensation product containing at least two sulphonamide residues.

2. A composition of matter containing cellulose acetate and a condensation product of an aliphatic halide containing at least two halogen atoms and at least one alcoholic group and a substance selected from the class consisting of toluene and xylene sulphonamides, said condensation product containing at least two sulphonamide residues.

3. A composition of matter containing a film-forming substance selected from the class of derivatives of cellulose consisting of organic acid esters of cellulose and cellulose ethers and an alkylation product of a condensation product of an aliphatic halide containing at least two halogen atoms and at least one alcoholic group and a substance selected from the class consisting of toluene and xylene sulphonamides, said condensation product containing at least two sulphonamide residues.

4. A composition of matter containing a film-forming substance selected from the class of derivatives of cellulose consisting of organic acid esters of cellulose and cellulose ethers and an acidylation product of a condensation product of an aliphatic halide containing at least two halogen atoms and at least one alcoholic group and a substance selected from the class consisting of toluene and xylene sulphonamides, said condensation product containing at least two sulphonamide residues.

WILLIAM HENRY MOSS.

CERTIFICATE OF CORRECTION.

Patent No. 2,260,329. October 28, 1941.

WILLIAM HENRY MOSS.

It is hereby certified that error appears in the printed specification of the above numbered patent requiring correction as follows: Page 2, first column, line 40, for "esterified" read --etherified--; and that the said Letters Patent should be read with this correction therein that the same may conform to the record of the case in the Patent Office.

Signed and sealed this 2nd day of December, A. D. 1941.

(Seal)

Henry Van Arsdale,
Acting Commissioner of Patents.